United States Patent
Schuetz (10) Patent No.: US 10,956,384 B2
(45) Date of Patent: Mar. 23, 2021

(54) ASSESSING AGGREGATED DATA QUALITY

(71) Applicant: International Business Machines Corporation, Armonk, NY (US)

(72) Inventor: Werner Schuetz, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 16/292,428

(22) Filed: Mar. 5, 2019

(65) Prior Publication Data
US 2020/0285623 A1  Sep. 10, 2020

(51) Int. Cl.
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
None
See application file for complete search history.

(56) References Cited

U.S. PATENT DOCUMENTS

| | | | | |
|---|---|---|---|---|
| 8,577,902 B1 * | 11/2013 | Ye | ......................... | H03M 7/46 707/752 |
| 2009/0259679 A1 * | 10/2009 | Thiesson | ............... | G06F 16/904 |
| 2015/0006491 A1 | 1/2015 | He et al. | | |
| 2015/0278334 A1 * | 10/2015 | Gerweck | ............... | G06F 16/284 707/706 |
| 2015/0310055 A1 | 10/2015 | Derstadt | | |
| 2016/0179905 A1 | 6/2016 | Gibbons | | |
| 2017/0228451 A1 * | 8/2017 | Hughes | ............... | G06F 16/2425 |
| 2017/0316003 A1 * | 11/2017 | Mor | .................... | G06F 16/2455 |
| 2018/0246912 A1 | 8/2018 | Arning et al. | | |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

*Primary Examiner* — Son T Hoang
(74) *Attorney, Agent, or Firm* — David K. Mattheis; William H. Hartwell; Nicholas L. Cadmus (57) ABSTRACT

Processing a set of records, each record of the dataset having multiple attributes, including a dimension group of attributes and a measure group of attributes. Each record of the dataset is processed by: comparing a current value of at least one attribute of the record's dimension group with a previous value of the attribute in a previously processed record and creating a new record. The value of each attribute of the new record is determined as a combination of the values of the attribute in the set of records. The values of each attribute of the new record are associated with a quality score determined as a combination of quality scores of the attribute in the set of records.

20 Claims, 8 Drawing Sheets

Fig. 1

|  | 201A | 201B | 201C | 203A | 206A | 203B | 206B |
|---|---|---|---|---|---|---|---|
|  | Country | Product group | Order method | Revenue | Revenue quality trust | Items | Items quality trust |
| 205.1 → | Canada | Camping Equipment | E-mail | DEM1,000 | 0% | 100 | 100% |
| 205.2 → |  |  | Z-mail | $100 | 0% | 10 | 0% |
| 205.3 → |  |  | E-mail | $5,600 | 50% | 0 | 0% |
| 205.4 → |  |  | Mail | $1,300 | 100% | 130 | 100% |
| 205.5 → |  |  | Web | $2,600 | 100% | 260 | 100% |
| 205.6 → |  | Campino Equipment | E-mail | $4,890 | 0% | 489 | 0% |
| 205.7 → |  |  | Web-mail | $9,840 | 0% | 984 | 0% |
| 205.8 → | Canasia | Camping Equipment | Web | $7,610 | 0% | 761 | 0% |

Fig. 2A

| Country | Product group | Order method | Revenue | Revenue quality trust | Items | Items quality trust | |
|---|---|---|---|---|---|---|---|
| Canada | Camping Equipment | E-mail | DEM 1,000 | 0% | 100 | 100% | ← 205.1 |
| | | Z-mail | $100 | 0% | 10 | 0% | ← 205.2 |
| | | E-mail | $5,600 | 50% | 0 | 0% | ← 205.3 |
| | | Mail | $1,300 | 100% | 130 | 100% | ← 205.4 |
| | | Web | $2,600 | 100% | 260 | 100% | ← 205.5 |
| | Camping Equipment | | $10,600 | 63% | 500 | 46% | ← 208.1 |
| | Campino Equipment | E-mail | $4,890 | 0% | 489 | 0% | ← 205.6 |
| | | Web-mail | $9,840 | 0% | 984 | 0% | ← 205.7 |
| | Campino Equipment | | $14,730 | 0% | 1473 | 0% | ← 208.2 |
| Canasia | Camping Equipment | Web | $7,610 | 0% | 761 | 0% | ← 205.8 |
| | Camping Equipment | | $7,610 | 0% | 761 | 0% | ← 208.3 |

ASSESSING AGGREGATED DATA QUALITY

BACKGROUND

The present invention relates to the field of digital computer systems, and more specifically, to a method of processing a dataset.

Controlling database systems based on a reduced amount of data such as aggregated attribute values of a dataset may be beneficial, in particular as the quality of the dataset can accurately be represented by the aggregated attribute values. However, when data with a poor quality are used for an aggregation, this could lead to an inappropriate control of the systems.

SUMMARY

Computer implemented methods, systems and program products for the processing of data sets are provided. In one aspect, the invention relates to processing a set of records, each record of the dataset having multiple attributes, including a dimension group of attributes and a measure group of attributes. Records are processed by: comparing a current value of at least one attribute of the record's dimension group with a previous value of the attribute in a previously processed record and creating a new record. The value of each attribute of the new record is determined as a combination of the values of the attribute in the set of records. The values of each attribute of the new record are associated with a quality score determined as a combination of the quality scores of the attribute in the set of records.

In one aspect, a quality score is associated with each attribute value of the measure group attributes for records having at least one attribute value of the dimension group associated with a quality score below a threshold and where the first value of at least one attribute of the dimension group of the first record and the second value of the at least one attribute of the second record are identical.

In one aspect, the method includes calculating a quality score for each measure group attribute associated with a quality rule, for records having at least one attribute value of the dimension group associated with a quality score above a threshold and where the first value of at least one attribute of the dimension group of the first record and the second value of the at least one attribute of the second record are identical.

In one aspect, the method includes associating a low quality score with the measure group attribute value for each measure group attribute unassociated with a quality rule, for records having at least one attribute value of the dimension group associated with a quality score above a threshold and where the first value of at least one attribute of the dimension group of the first record and the second value of the at least one attribute of the second record are identical.

BRIEF DESCRIPTION OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In an embodiment, the scoring and modification of a dataset can be used for controlling operation of one or more systems. In this embodiment, only the new records that are created in the dataset may be used for controlling the systems. This may enable efficient and accurate controlling methods.

In an embodiment, a quality score may be securely reported for measures on each aggregation level of a dataset by evaluating a data quality for each dimension and measure as well as for the aggregation summaries based on an aggregation group change.

In an embodiment, the measure group of attributes comprises one or more attributes having numerical values that can be processed using mathematical functions such as the sum, average etc. For example, a sales revenue attribute is a measure because a total or average of the data can be derived from the values of the attribute. The dimension group of attributes comprises one or more attributes whose values are qualitative values, e.g., do not total a sum. For example, sales region, employee, location, or date are examples of a dimension group attribute.

In an embodiment, an aggregation group may be a set of records of the dataset that share the same values of the at least one given attribute. Once at least one value of the given attribute changes for a current record (compared to a most recently processed record), the aggregation group changes, e.g., the most recently processed record may be the last record of the aggregation group that has changed.

This embodiment may enable an efficient and reliable scoring method of the attribute values of the dataset. A safe method may be implemented by one or more predefined programs and/or systems, e.g., a user may define a list of methods that are safe methods. For example, a safe method may be a database function or a quality safe ETL job. Thus, an ID generated by a database function or object generated by a quality safe ETL job may be said to be created by a safe method.

In an embodiment, the method further comprises processing each attribute of the dimension group attributes. The processing of each attribute comprises:

For attributes not associated with a quality rule and with attribute values that were not derived by a predefined safe method, associating a low quality score with the attribute values;

For attributes associated with a quality rule and with attribute values that were not derived by a predefined safe method, executing the quality rule for determining a quality score for each attribute value of the attribute.

For attributes with attribute values derived by a predefined safe method, associating the attribute values of the attribute with a predefined quality score.

In an embodiment, the combination of the values of the attribute in the set of records is the sum of the values of the attribute.

In an embodiment, the combination of the quality scores associated with attribute values of the attribute in the set of records is a weighted sum of the quality scores associated with attribute values, wherein the weighted sum uses a predefined weight for a respective attribute value.

In an embodiment, the weight is the ratio of the attribute value and the sum of the attributes' values.

Figure 1:
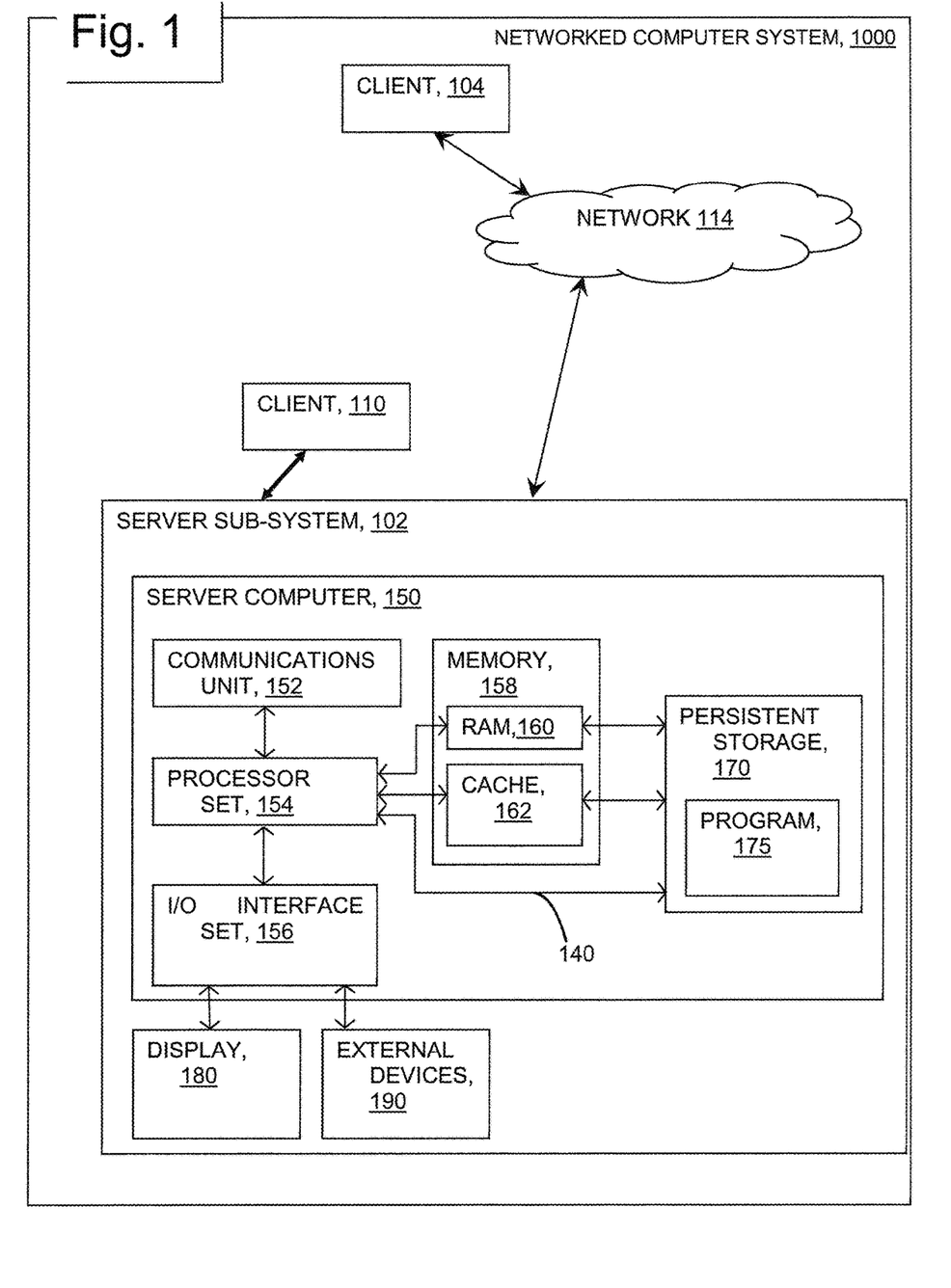
FIG. 1 provides a schematic illustration of a computerized system, according to an embodiment of the invention.

FIG. 1 provides a schematic illustration of exemplary network resources associated with practicing the disclosed inventions. The inventions can be practiced in the processors of any of the disclosed elements which process an instruction stream. As shown in the figure, a Client device 104 connects wirelessly to server sub-system 102 via network 114. Client device 110 connects directly to server sub-system 102. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, cache 162, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory 160 (RAM). In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the dataset processing program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., dataset processing program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2A:
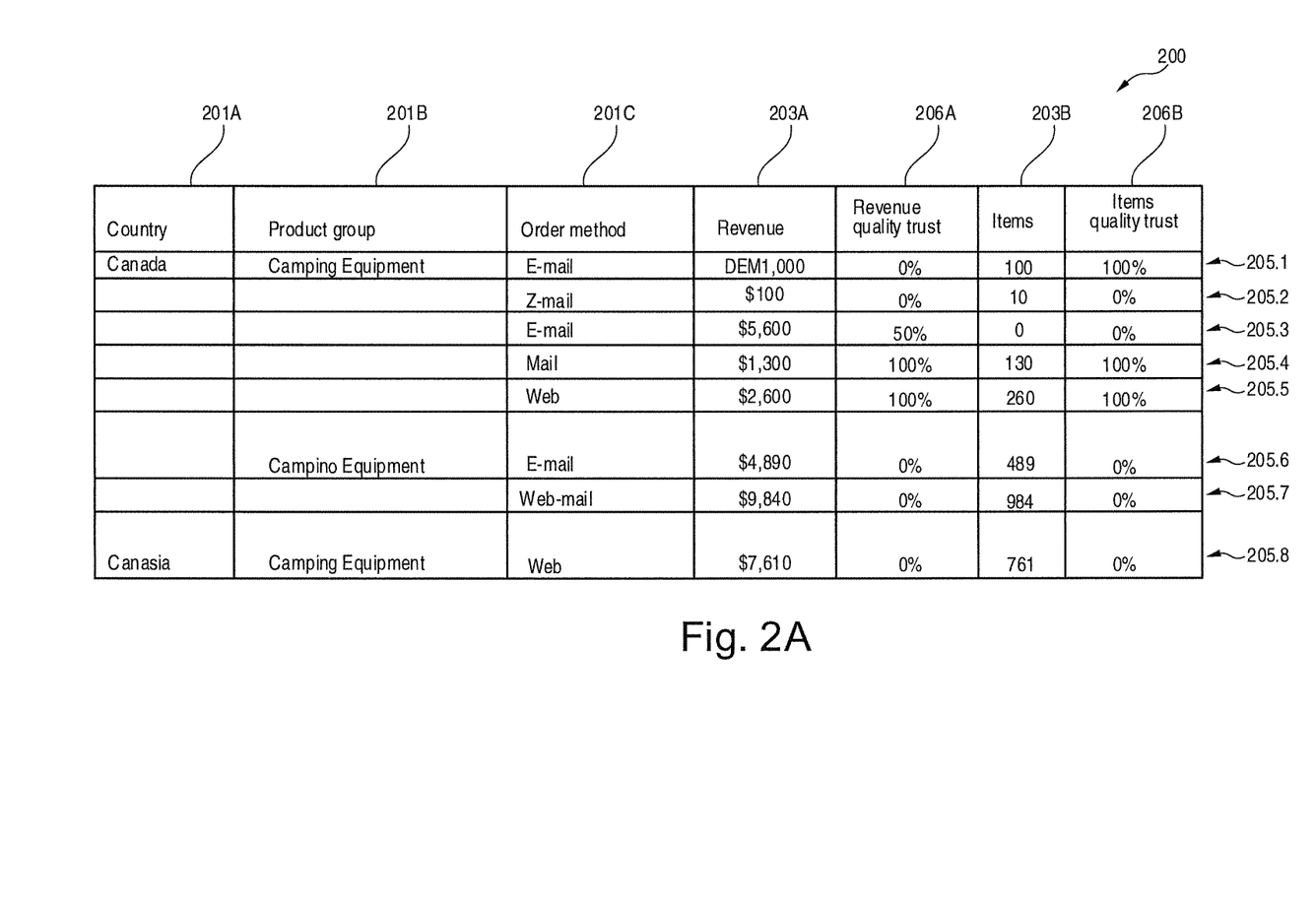
FIG. 2A depicts a dataset, according to an embodiment of the invention.

FIG. 2A depicts a dataset 200 in accordance with an example of the present disclosure.

The dataset 200 comprises attributes 201A-C (collectively referred to as 201) and 203A-B (collectively referred to as 203). The attributes 201A-C form a group of attributes named dimension group of attributes 201. The attributes 203A-B form a group of attributes named measure group of attributes 203.

The values of each of the attributes 201A-C of the dimension group may be shared between multiple records having different values of the measure group attributes 203A-B.

For example, the attribute 201A represents a country name which can be shared between multiple records. For example, records 205.1-205.5 form a set of records that share same value "Canada" of the attribute 201A and same value "Product group" of the attribute 201B. A subset of the set of records 205.1-205.5 may also share values of the attribute 201C.

Each of the attributes of the measure group 203 may be associated with a quality score or quality trust. For example, the attribute "revenue" 203A is associated with quality scores 206A and attribute "Items" is associated with quality scores 206B. The quality score of a given attribute value may for example be obtained using one or more quality verification methods.

The dataset 200 comprises three sets of records (or aggregation groups), namely set of records 205.1-205.5, set of records 205.6-205.7 and set of record 205.8. These three sets of records share the same values of the attributes 201A and 201B and part of records of these sets share the same value of the attribute 201C.

Figure 2B:
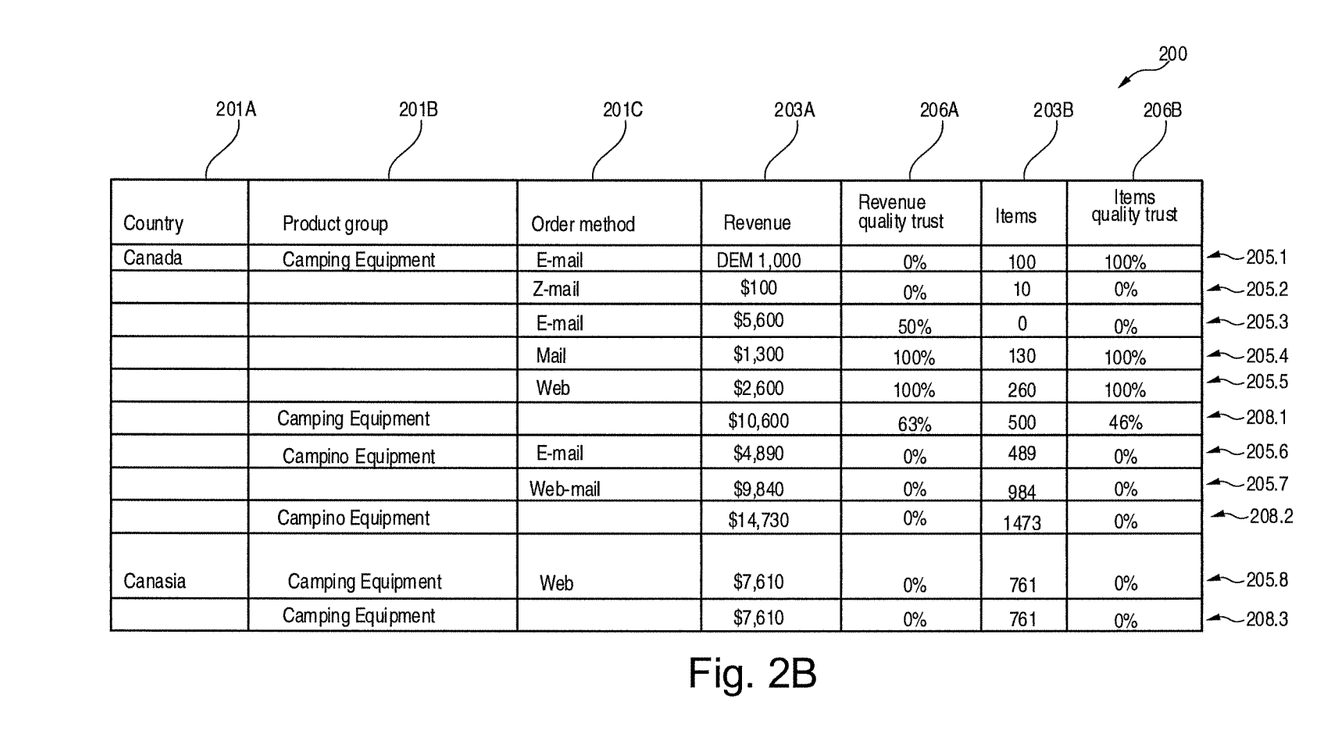
FIG. 2B depicts a dataset, according to an embodiment of the invention.

FIG. 2B depicts a dataset, e.g., 200 after being processed in accordance with an example of the present disclosure.

In comparison to dataset 200 of FIG. 2A, the dataset of FIG. 2B comprises additional new records 208.1-208.3. The new records 208.1-208.3 comprises aggregation values of attributes values of the respective sets of records 205.1-205.5, 205.6-205.7 and 205.8.

For example, when processing record 205.8, it may be determined that dimension value 'Canasia' is an invalid country, e.g., an exception is detected by a quality rule when checking the value "Canasia". In this case, all measures (revenue and items) for this record 205.8 are flagged with quality trust=0%.

When processing record 205.6, it may be determined that the dimension value 'Campino Equipment' is an invalid product group, e.g., an exception is detected by a quality rule. In this case, all measures (revenue and items) for this record are flagged with quality trust=0%.

When processing record 205.7, it may be determined that the dimension value 'Web mail' is an invalid order method, e.g., an exception is detected by a quality rule. In this case, all measures (revenue and items) for this record are flagged with quality trust=0%.

When processing record 205.1, it may be determined that the revenue 'DEM 1,000' is an invalid currency, e.g., an exception is detected by a quality rule. In this case, only this measure value is flagged with quality trust=0%.

When processing record 205.6, it may be determined that an aggregation group change occurs for product group 'Camping Equipment' within country 'Canada'. In this case, the measure 'revenue' is aggregated to $10,600, and the quality trust is calculated by the weighted average related to revenue weight within the product group 'Camping Equipment'.

When processing record 205.3, it may be determined that all dimension attributes (country, product group and order method) are valid and no exception has been detected by quality rules. If, for example, two quality rules exist for measure attribute "revenue", both rules are executed with a predicate where country='Canada' and product_group='Camping Equipment' and order_method='E-Mail'. Since the first one (country='Canada' and product_group='Camping Equipment') returns a rule met of 100%, and the second one (order_method='E-Mail') returns a rule met of 50%, the measure attribute of this record 205.3 may be flagged with a quality trust of the lowest result i.e., 50%.

Figure 3:
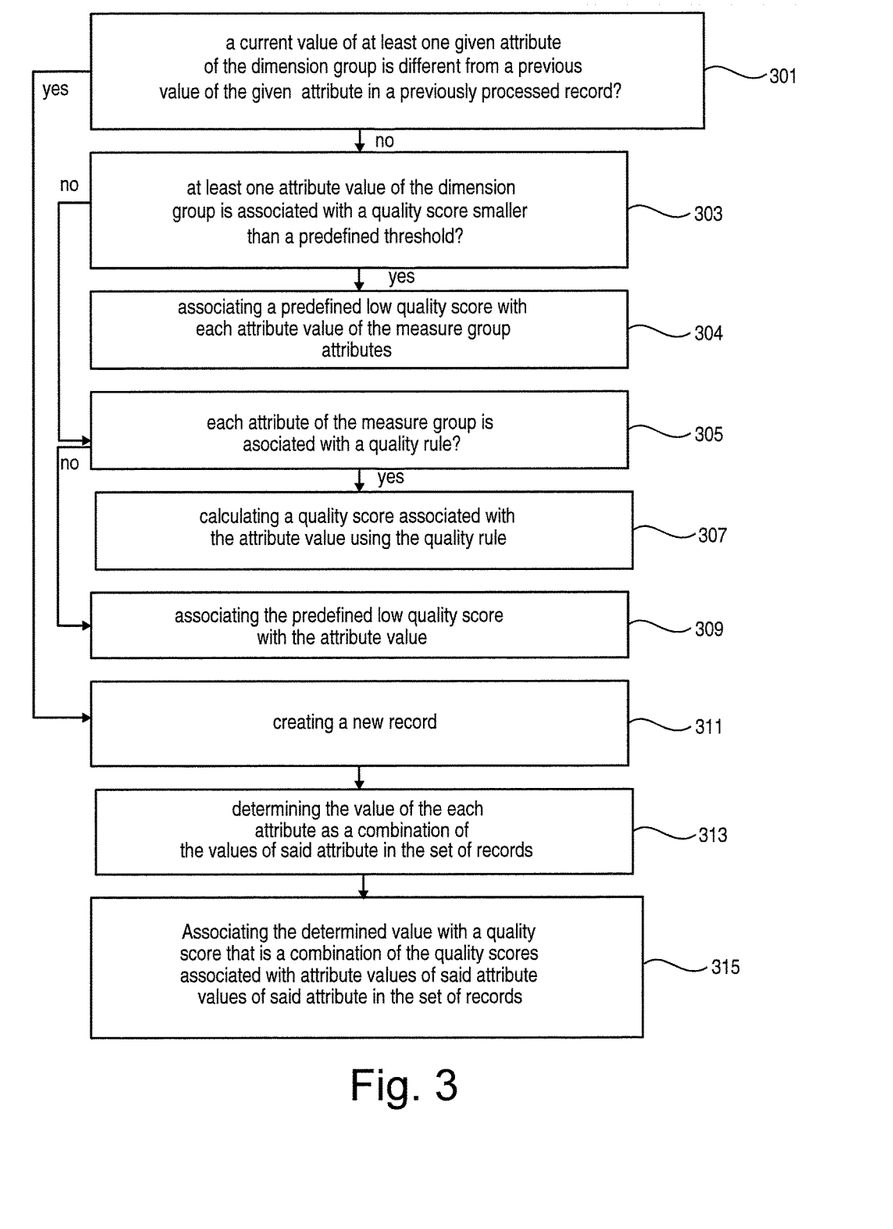
FIG. 3 is a flowchart of operational steps of a method of processing a dataset, according to an embodiment of the invention.

FIG. 3 is a flowchart of a method for processing a dataset, e.g., 200 of FIG. 2A.

For each record 205.1-8 of the dataset 200, the processing comprises:

In inquiry step 301, it may be determined if a current value of at least one given attribute (e.g., 201B) of the dimension group 201 is different from a previous value of the at least one given attribute 201 in a previously processed record. The at least one given attribute may, for example, comprise user defined attributes or high ranked attributes, e.g., attribute 201A is ranked higher than 201B, and 201B is ranked higher than 201C as values of 201A are provided in the first column, values of 201B are provided in a second column and so on. The at least one given attribute may for example comprise attributes 201A and 201B. In this case, it may be checked that each of the two attributes 201A and 201B has or has not changed for the current record in comparison to the values of that attributes of a previously processed record.

If (inquiry step 301) the current value is the same as the previous value (e.g., if more than one given attribute is used, this checks that values of the all given attributes are the same as the values of the all given attributes in the lastly processed previous record), it may be determined (inquiry step 303) if at least one attribute value of the dimension group 201 is associated with a quality score smaller than a predefined threshold. If at least one attribute value of the dimension group 201 is associated with a quality score smaller than the predefined threshold, a predefined low quality score may be associated in step 304 with each attribute value of the measure group attributes 203. Following the example dataset 200 of FIG. 2, the record 205.2 has a wrong attribute value "Z-mail" of an attribute 201C of the dimension group 201. This may result in the attribute value "Z-mail" being assigned a low quality score that does not exceed the predefined threshold. In this embodiment, the predefined threshold value is zero. Thus, the values of the attributes 203A and 203B of the record 205.2 are associated with a predefined low quality score, e.g., zero.

If (inquiry step 303) all attribute values of the dimension group 201 are associated with a quality score higher than or equal to the predefined threshold, it may be determined (inquiry step 305) if each attribute of the measure group 203 is associated with a quality rule.

If (inquiry step 305) an attribute of the measure group 203 is associated with a quality rule, a quality score associated with the attribute value may be calculated in step 307 using the quality rule, otherwise the predefined low quality score may be associated in step 309 with the attribute value.

If (inquiry step 301) the current value is different from the previous value (e.g., if more than one given attribute is used, this refers to the fact that the value of at least one of the given attributes is different from a previous one), a new record may be created in step 311 wherein for each attribute of the measure group 203 of the new record, the value of the each attribute may be determined, in step 313, as a combination of the values of the attribute in the set of records, and the determined value may be associated, in step 315, with a quality score that is a combination of the quality scores associated with attribute values of the attribute in the set of records.

As shown in FIG. 2B, since the current value of the attribute 201B has changed in record 205.6, the new record 208.1 has been created. The new record 208.1 comprises combined values of the attributes 203A-B and 206A-B of the set of records 205-1-205.5. For example, the value of the attribute "Revenue" 203A in the new record 208.1 is the sum of the values of the attribute "Revenue" in the five records 205.1-205.5. The value of the attribute "Items" 203B in the new record 208.1 is the sum of the values of the attribute "Items" in the five records 205.1-205.5.

In an embodiment, the value of a new attribute may be a weighted sum. In an embodiment, the weighted sum uses predefined weights derived according to the contribution of an attribute value to an attribute value sum defined as the ratio of the value to the sum of the values. The value of the attribute 206A in the new record 208.1 is a sum of the values of the attribute 206A in the five records 205.1-205.5 weighted by the contribution of each of the values of the attribute "revenue" to the total value of 10600: 63%=(1000/10600)*0%+(100/10600)*0%+(5600/10600)*50%+(1300/10600)*100%+(2600/10600)*100%. The value of the attribute 206B in the new record 208.1 is a sum of the values of the attribute 206B in the five records 205.1-205.5 weighted by the contribution of each of the values of the attribute "Items" to the total value of 500: 46%=(100/500)*100%+(10/500)*0%+(0/500)*0%+(130/500)*100%+(260/500)*100%.

The new records 208.2-3 are determined similarly as described with record 208.1.

Figure 4:
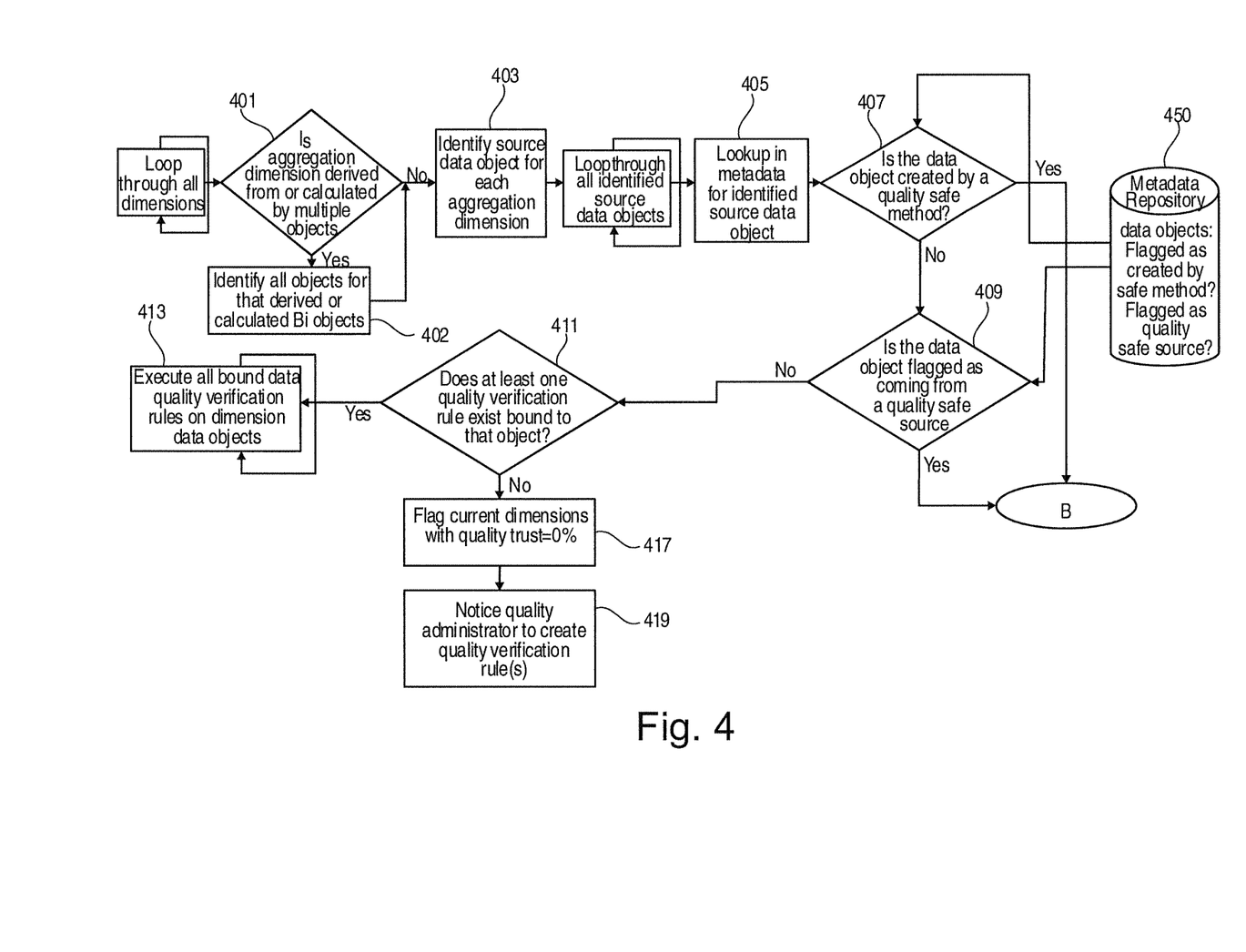
FIG. 4 is a flowchart of operational steps of a method for scoring a dataset, according to an embodiment of the invention.

FIG. 4 is a flowchart of an example method for scoring a dataset e.g., 200. For each attribute (dimension attribute) of the dimension group 201 of the dataset 200, following steps 401-419 may be performed.

In an embodiment, it can be determined (inquiry step 401) if the dimension attribute 201 is derived from multiple data objects. For example, it can be determined if the values of the dimension attribute are a combination of values of one or more attributes that are obtained from respective data objects. If for example, a dimension attribute value is "Canada-America", this may indicate that the dimension attribute is derived from two attributes "country" and "continent", whose values may be obtained from two different data objects (e.g., a database or file).

If the dimension attribute 201 is derived from multiple data objects, the data objects are identified in step 402.

Each one or more data objects from which the values of the dimension attribute 201 are obtained or derived can be identified in step 403. For each identified object of the dimension attribute steps 405-419 may be performed.

In an embodiment, each identified data object of the identified data objects, may be searched in a metadata repository 450 at step 405. The origin of the identified data objects may be evaluated. It may be determined, using metadata associated with the identified data object, in inquiry step 407, if the data object is created by a quality safe method, e.g., it may be determined if the attribute values that are derived or obtained from the identified data object are derived or measured or calculated using the quality safe method.

If the identified data object is not created with the quality safe method, it may be determined (inquiry step 409) if the identified data object is flagged as coming from a quality safe source using metadata of the identified object. If the identified data object is not flagged as coming from a quality safe source, it may be determined (inquiry step 411) if at least one quality verification rule exists and bounds to the identified data object. If at least one quality verification rule exists and bounds to the identified data object, the at least one rule may be executed in step 413 on the identified data object, e.g., it may be executed on attribute values that obtained from the identified data object. And after executing the rule on the identified data object, the method may end or may continue with the method of FIG. 5. If no quality verification rule exists and bounds to the identified data object, the dimension attribute may be flagged or associated with a quality trust of 0% at step 417. And in step 419, an administrator may be informed to create a quality verification rule for the identified data object. And after executing step 419, the method may end or may continue with the method of FIG. 5.

Figure 5:
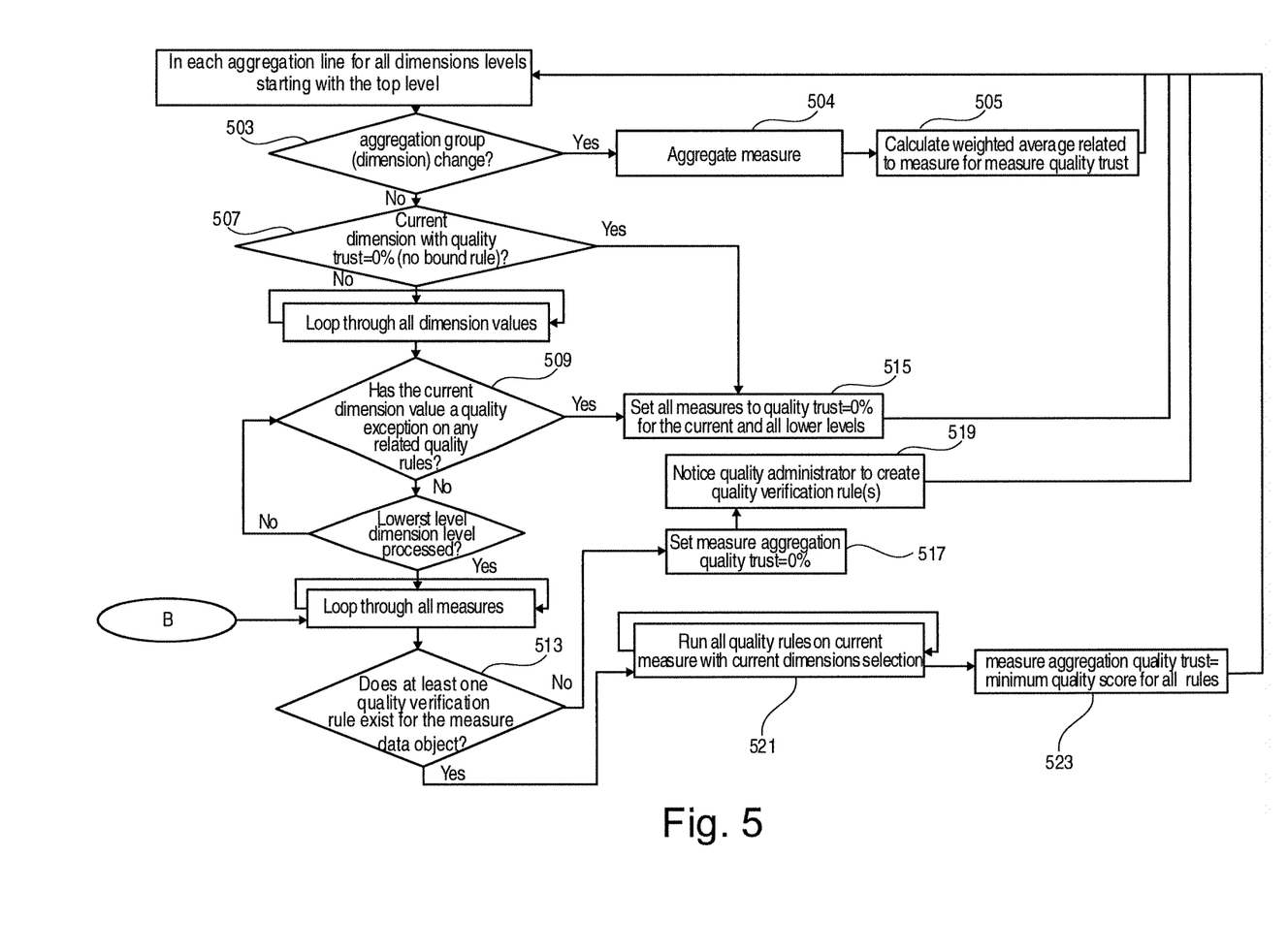
FIG. 5 is a flowchart of operational steps of a method for processing a dataset, according to an embodiment of the invention.

If (inquiry step 407) the identified data object is created by a quality safe method or if (inquiry step 409) the identified data object is flagged as coming from a quality safe source, the method may end or may continue at stage B of FIG. 5 (e.g., for verifying attributes 203). For example, the metadata for all identified source data objects are looked up to detect if the data object has been created by a quality safe method or is coming from a quality safe source (e. g. an id generated by a database function or object generated by a quality safe ETL job). This token in the metadata data object entry can either programmatically be set by the creation process respectively a quality insurance process or manually be set by a data quality administrator. If the quality safe token has been set, then no quality validation has to be performed for the current data object.

FIG. 5 is a flowchart of an example method for processing a dataset, e.g., 200.

For each record 205.1-8 of the dataset 200 following steps 503-523 may be performed.

It may be determined (inquiry step 503) for the current record if at least one value of the attributes of the dimension group 201 has changed with respect to a previous processed record. For example, for current record 205.2 it may be determined if value "Canada" of current dimension attribute "country" is different from the value of the dimension attribute "country" of the previous processed record 205.1 and if value "Camping Equipment" of current dimension attribute "product group" is different from the value of the dimension attribute "product group" of the previous processed record 205.1. In other terms, the inquiry step 503 checks if the aggregation group has changed, e.g., if the aggregation group of records 205.1-205.5 has changed to a next aggregation group of records 205.6-205.7.

If (inquiry step 503) for the current record the aggregation group has changed with respect to a previous processed record, steps 504-505 may be performed. This may for example be the case if the current record is 205.6 and the current dimension attribute is 201B, because the value of the attribute 201B has changed in record 205.6 with respect to the value of the attribute 201B of the previous record 205.5. In step 504, the values of the attributes 203A and 203B may be combined, e.g., aggregated. This is, for example, indicated with new records 208.1-3 of FIG. 2B, where the aggregated value of the attributes 203A and 203B is stored as a value of the attributes 203A and 203B in the new records 208.1-3. In step 505, the quality scores 206A and 206B of the aggregation group may be combined using a weighted sum to obtain new score values of the attributes 206A and 206B in the new record.

If (inquiry step 503) for the aggregation group has not changed with respect to a previous processed record, steps 507-523 may be performed.

In inquiry step 507, it may be determined if the current dimension group of attributes 201 of the current record is associated with a quality trust of zero. If the current dimension group of attributes 201 is associated with a quality trust of zero, all attribute values of the attributes 203A-B of the current record are associated in step 515 with a quality trust of zero.

If the current dimension group of attributes 201 of the current record is not associated with a quality trust of zero, steps 509-523 may be performed for each dimension attribute 201A-C of the dimension group 201.

It may be determined (inquiry step 509) if the value of the current dimension attribute has a quality exception resulting from a check of that value by a quality rule.

If the value of the current dimension attribute has a quality exception, step 515 may be performed. Otherwise, it may be determined in inquiry step 513 for each value of the attributes 203 of the current record if at least one quality verification rule exists. If the quality verification rule exists steps 521 and 523 may be performed, otherwise steps 517 and 519 may be performed.

In step 517, a quality trust of zero may be associated with the current measure attribute, and an administrator may be informed in step 519 to create a quality verification rule for the current measure attribute.

In step 521, the at least one quality verification rule may be executed on the current measure attribute value. In step 523 a quality trust may be associated with the current measure attribute value. The quality trust may be the minimum quality score of the at least quality verification rule.

In another example, a method for reporting measures on data is provided. The method comprises: defining at least a first measure to be reported; defining dimensions for reporting the first measure, for aggregating the dimension-specific values of the first measure; determining data quality rules for the first measure to be reported; (optional) determining whether a quality exception is applicable for a dimension value and, if yes, presetting all data quality scores of the dimension-specific values of the first measure for the affected dimension value to zero; and for non-preset data quality scores, determining data quality scores on aggregation dimension level for the first measure based on the data quality rules.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
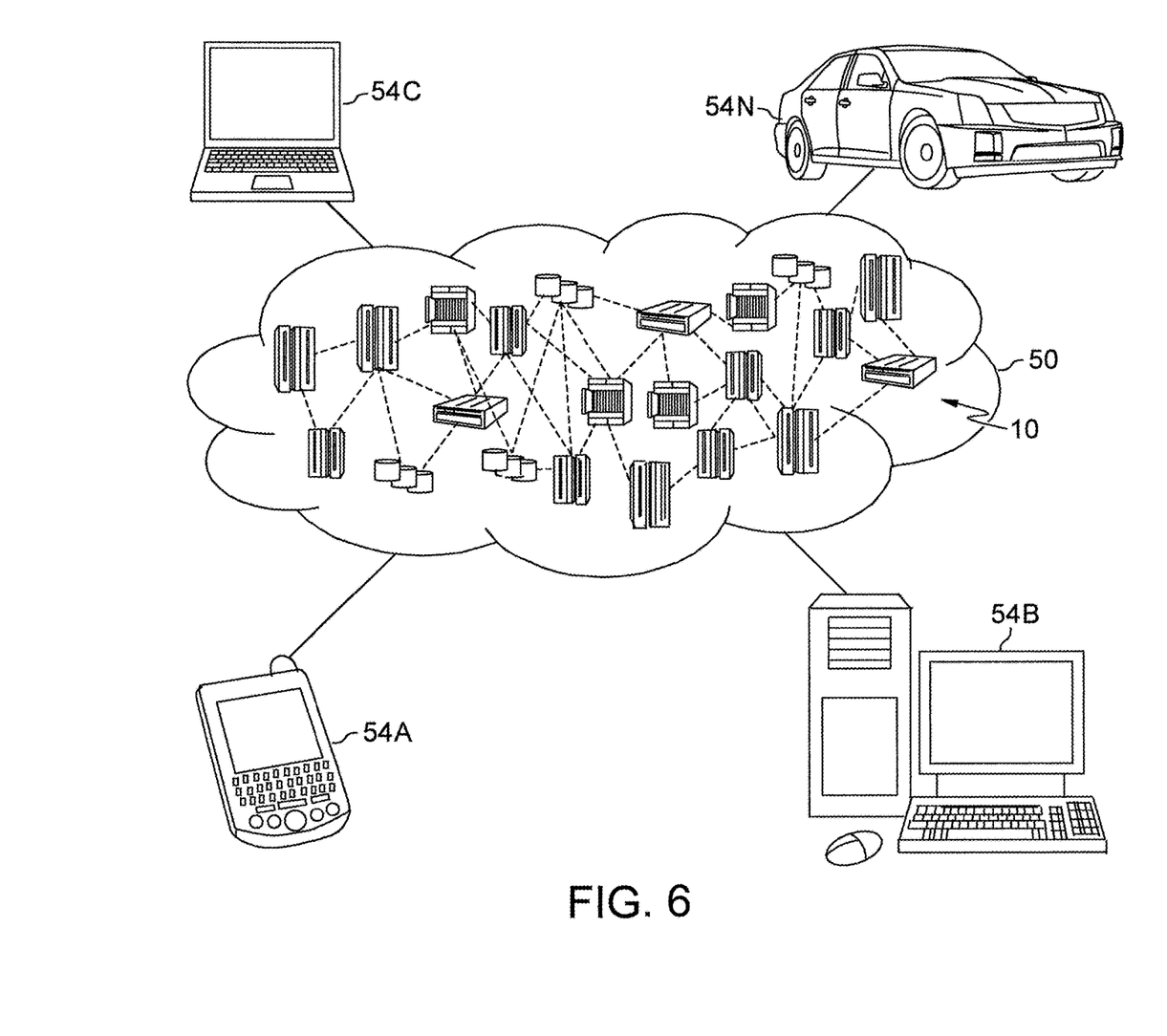
FIG. 6 depicts a cloud computing environment, according to an embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
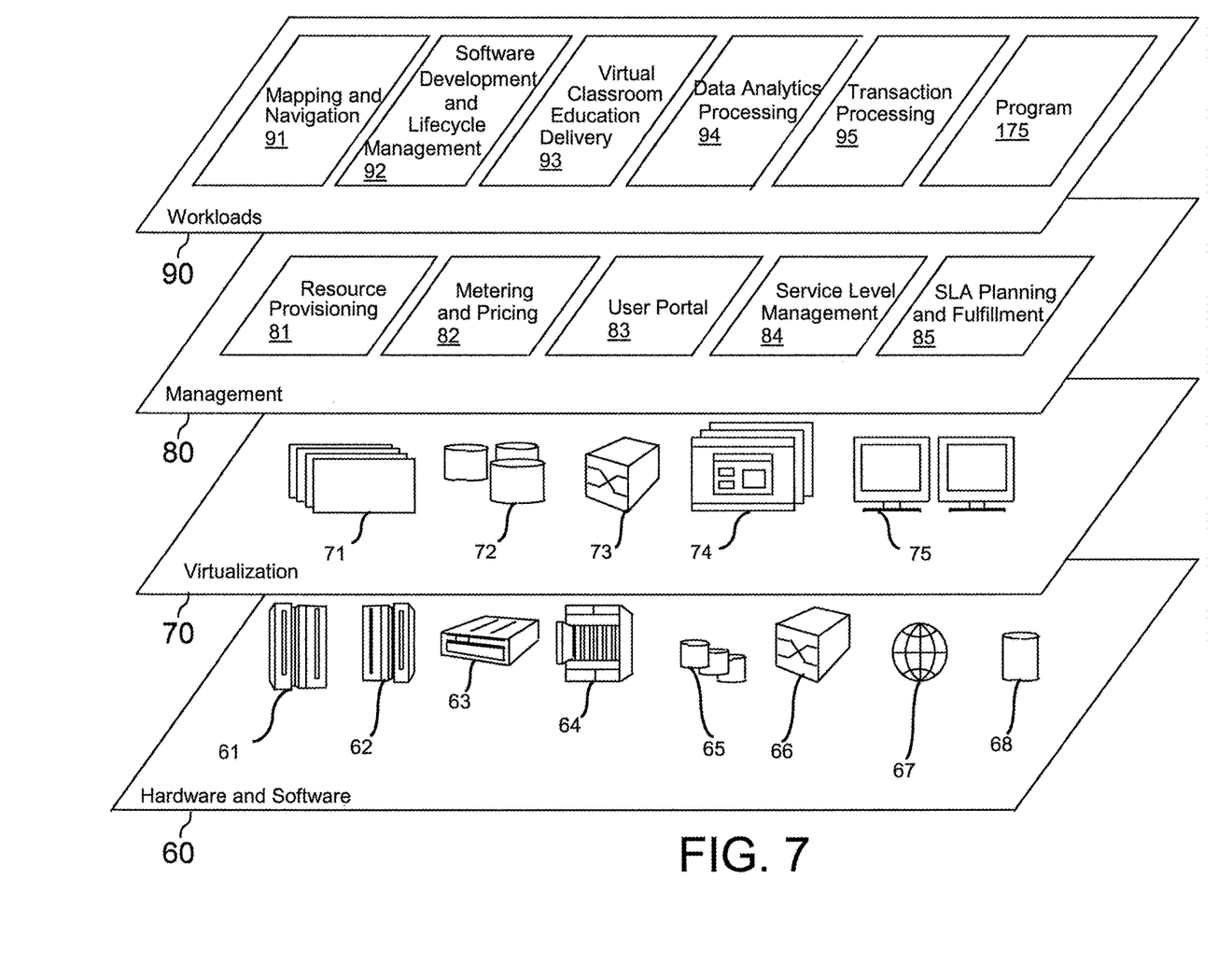
FIG. 7 depicts abstraction model layers, according to an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dataset processing program 175.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for processing a dataset comprising:
receiving, by one or more computer processors and over a network, the dataset comprising a set of records, wherein each record of the dataset comprises a dimension group of attributes comprising one or more attributes whose values are qualitative, and a measure group of attributes comprising one or more attributes having numerical values;
comparing, by one or more computer processors, a first value of at least one attribute of the dimension group of a first record with a second value of the at least one attribute of a second record;
associating, by one or more computer processors, a quality score with each attribute value of the measure group attributes for records having at least one attribute value of the dimension group associated with a quality score below a threshold and wherein the first value of at least one attribute of the dimension group of the first record and the second value of the at least one attribute of the second record are identical;
calculating, by one or more computer processors, for each measure group attribute associated with a quality rule, a quality score associated with the measure group attribute value using the quality rule, for records having at least one attribute value of the dimension group associated with a quality score above the threshold and wherein the first value of at least one attribute of the dimension group of the first record and the second value of the at least one attribute of the second record are identical;
associating, by one or more computer processors, a low quality score with the measure group attribute value for each measure group attribute unassociated with the quality rule, for records having at least one attribute value of the dimension group associated with the quality score above the threshold and wherein the first value of at least one attribute of the dimension group of the first record and the second value of the at least one attribute of the second record are identical;
creating, by one or more computer processors, a new record, wherein a value of each attribute of the new record is determined at least in part according to a combination of values of the attribute in the set of records; and
associating, by one or more computer processors, the value of each attribute of the new record with a quality score determined according to a combination of quality scores associated with attribute values of the attribute in the set of records.

2. The method according to claim 1, further comprising:
associating the low quality score with the attribute values for the attributes unassociated with the quality rule that were not derived according to a safe method;
determining a quality score for each attribute value of a respective attribute according to the quality rule for the attributes associated with the quality rule that were not derived according to the safe method; and
associating the attribute values of the respective attribute with a predefined quality score for attributes derived according to a safe method.

3. The method according to claim 1, wherein the combination of values of the attribute in the set of records is a sum of the values of the attribute.

4. The method of claim 3, wherein the combination of quality scores associated with the attribute values of the attribute in the set of records is a weighted sum of quality scores associated with the attribute values, wherein the weighted sum uses a predefined weight for a respective attribute value of the attribute values.

5. The method of claim 4, wherein the predefined weight is a ratio of the attribute value and the sum of the values of the attribute.

6. The method according to claim 1, further comprising determining, by one or more computer processors, an origin of the attribute values of the attribute according to metadata of the set of records.

7. The method according to claim 1, further comprising controlling system operations according to the new record.

8. A computer program product comprising one or more computer readable storage devices and stored program instructions on the one or more computer readable storage devices, the stored program instructions comprising:
- programmed instructions for receiving, over a network, a dataset comprising a set of records, wherein each record of the dataset comprises a dimension group of attributes comprising one or more attributes whose values are qualitative, and a measure group of attributes comprising one or more attributes having numerical values;
- programmed instructions for comparing a first value of at least one attribute of the dimension group of a first record with a second value of the at least one attribute of a second record;
- programmed instructions for associating a quality score with each attribute value of the measure group attributes for records having at least one attribute value of the dimension group associated with a quality score below a threshold and wherein the first value of at least one attribute of the dimension group of the first record and the second value of the at least one attribute of the second record are identical;
- programmed instructions for calculating, for each measure group attribute associated with a quality rule, a quality score associated with the measure group attribute value using the quality rule, for records having at least one attribute value of the dimension group associated with a quality score above the threshold and wherein the first value of at least one attribute of the dimension group of the first record and the second value of the at least one attribute of the second record are identical;
- programmed instructions for associating a low quality score with the measure group attribute value for each measure group attribute unassociated with the quality rule, for records having at least one attribute value of the dimension group associated with the quality score above the threshold and wherein the first value of at least one attribute of the dimension group of the first record and the second value of the at least one attribute of the second record are identical;
- programmed instructions for creating a new record, wherein a value of each attribute of the new record is determined at least in part according to a combination of values of the attribute in the set of records; and
- programmed instructions for associating the value of each attribute of the new record with a quality score determined according to a combination of quality scores associated with attribute values of the attribute in the set of records.

9. The computer program product according to claim 8, the stored program instructions further comprising:
- programmed instructions for associating the low quality score with the attribute values for the attributes unassociated with the quality rule that were not derived according to a safe method;
- programmed instructions for determining a quality score for each attribute value of a respective attribute according to the quality rule for the attributes associated with the quality rule that were not derived according to the safe method; and
- programmed instructions for associating the attribute values of the respective attribute with a predefined quality score for attributes derived according to a safe method.

10. The computer program product according to claim 8, wherein the combination of values of the attribute in the set of records is a sum of the values of the attribute.

11. The computer program product according to claim 10, wherein the combination of quality scores associated with the attribute values of the attribute in the set of records is a weighted sum of quality scores associated with the attribute values, wherein the weighted sum uses a predefined weight for a respective attribute value of the attribute values.

12. The computer program product according to claim 11, wherein the predefined weight is a ratio of the attribute value and the sum of the values of the attribute.

13. The computer program product according to claim 8, the stored program instructions further comprising programmed instructions for determining an origin of the attribute values of the attribute according to metadata of the set of records.

14. The computer program product according to claim 8, the stored program instructions further comprising programmed instructions for controlling system operations according to the new record.

15. A computer system for processing a dataset, the computer system comprising:
- one or more computer processors;
- one or more computer readable storage devices;
- stored program instructions on the one or more computer readable storage devices for execution by the at least on computer processor, the stored program instructions comprising:
  - programmed instructions for receiving, over a network, a dataset comprising a set of records, wherein each record of the dataset comprises a dimension group of attributes comprising one or more attributes whose values are qualitative, and a measure group of attributes comprising one or more attributes having numerical values;
  - programmed instructions for comparing a first value of at least one attribute of the dimension group of a first record with a second value of the at least one attribute of a second record;
  - programmed instructions for associating a quality score with each attribute value of the measure group attributes for records having at least one attribute value of the dimension group associated with a quality score below a threshold and wherein the first value of at least one attribute of the dimension group of the first record and the second value of the at least one attribute of the second record are identical;
  - programmed instructions for calculating, for each measure group attribute associated with a quality rule, a quality score associated with the measure group attribute value using the quality rule, for records having at least one attribute value of the dimension group associated with a quality score above the threshold and wherein the first value of at least one attribute of the dimension group of the first record and the second value of the at least one attribute of the second record are identical;

programmed instructions for associating a low quality score with the measure group attribute value for each measure group attribute unassociated with the quality rule, for records having at least one attribute value of the dimension group associated with the quality score above the threshold and wherein the first value of at least one attribute of the dimension group of the first record and the second value of the at least one attribute of the second record are identical;

programmed instructions for creating a new record, wherein a value of each attribute of the new record is determined at least in part according to a combination of values of the attribute in the set of records; and programmed instructions for associating the value of each attribute of the new record with a quality score determined according to a combination of quality scores associated with attribute values of the attribute in the set of records.

16. The computer system according to claim 15, the stored program instructions further comprising:

programmed instructions for associating the low quality score with the attribute values for the attributes unassociated with the quality rule that were not derived according to a safe method;

programmed instructions for determining a quality score for each attribute value of a respective attribute according to the quality rule for the attributes associated with the quality rule that were not derived according to the safe method; and programmed instructions for associating the attribute values of the respective attribute with a predefined quality score for attributes derived according to a safe method.

17. The computer system according to claim 15, wherein the combination of values of the attribute in the set of records is a sum of the values of the attribute.

18. The computer system according to claim 17, wherein the combination of quality scores associated with the attribute values of the attribute in the set of records is a weighted sum of quality scores associated with the attribute values, wherein the weighted sum uses a predefined weight for a respective attribute value of the attribute values.

19. The computer system according to claim 18, wherein the predefined weight is a ratio of the attribute value and the sum of the values of the attribute.

20. The computer system according to claim 15, the stored program instructions further comprising programmed instructions for operating a system according to the new record.

* * * * *